United States Patent [19]

Ishizaki et al.

[11] Patent Number: 4,624,892

[45] Date of Patent: Nov. 25, 1986

[54] MAGNETIC RECORDING MEDIUM

[75] Inventors: Hideki Ishizaki; Hiroyuki Arioka; Toshiaki Ide, all of Tokyo, Japan

[73] Assignee: TDK Corporation, Tokyo, Japan

[21] Appl. No.: 750,173

[22] Filed: Jul. 1, 1985

[30] Foreign Application Priority Data

Jun. 29, 1984 [JP] Japan .............................. 59-133240

[51] Int. Cl.$^4$ .......................... G11B 5/70; G11B 5/72; B32B 5/16
[52] U.S. Cl. .................................... 428/323; 427/131; 428/329; 428/331; 428/694; 428/695; 428/900
[58] Field of Search ............... 428/694, 695, 900, 323, 428/329, 331, 332; 427/131, 128

[56] References Cited

U.S. PATENT DOCUMENTS

| | | | |
|---|---|---|---|
| 4,309,482 | 1/1982 | Suzuki et al. | 428/900 |
| 4,425,404 | 1/1984 | Suzuki et al. | 428/341 |
| 4,443,514 | 4/1984 | Yamamoto et al. | 428/464 |

*Primary Examiner*—Paul J. Thibodeau
*Attorney, Agent, or Firm*—Oblon, Fisher, Spivak, McClelland, & Maier

[57] ABSTRACT

A magnetic recording medium comprising a magnetic recording layer formed on one major surface of a non-magnetic substrate and a topcoat layer formed on the magnetic layer is characterized in that the topcoat layer contains a submicron particulate pigment observable under an electron microscope to have a linear distribution density of 10 to 1,000 per linear 100 μm and a particle size of less than 200 Å whereby the topcoat layer has a surface roughness R20 of not more than 400 Å.

15 Claims, No Drawings

MAGNETIC RECORDING MEDIUM

BACKGROUND OF THE INVENTION

This invention relates to a magnetic recording medium, and more particularly, to an improved magnetic recording medium having minimized head clogging and dropouts as well as excellent moving stability and runnability.

At present, magnetic recording media are widely used in a variety of applications including audio, video, computer, and other utilities in the form of magnetic tape, disc, etc. As the quantity of information required to record in magnetic recording media is increasing, a great improvement in recording density is increasingly demanded for such magnetic recording media.

Non-binder type magnetic recording media, that is, ferromagnetic thin film-bearing magnetic recording media are easier to fabricate in thinner form and have more saturation magnetization than coating type media. The non-binder type media, however, are rather insufficient in corrosion, impact, and frictional strength so that they might be subject to friction and even breakage due to high speed relative motion in contact with a magnetic head during recording, reproducing and erasing operations of magnetic signals. More particularly, since the ferromagnetic thin film is formed on a substrate by any desired processes such as electrodeposition, electroless deposition, sputtering, vacuum deposition or evaporation, and ion plating, the resulting magnetic medium is free of a binder so that the magnetic recording layer can be abraded away or broken by friction during sliding contact with a magnetic head.

In addition, the ferromagnetic thin film-bearing magnetic recording media are liable to corrosion at their surface. A progress of corrosion adversely affects physical properties such as head contact and abrasion resistance as well as electromagnetic properties.

To overcome these drawbacks, Japanese Patent Publication No. 39-25246 proposed to apply a lubricant to the surface of a ferromagnetic metal thin film. Simple coating of lubricant fails to provide continuous lubrication because it is readily removed off by a magnetic head and other rigid members. The application of lubricant is, of course, not expected of rust prevention and durability.

To continuously provide lubrication onto the magnetic recording layer, it is proposed in Japanese Patent Publication No. 57-29769 to form a lubricating or backcoat layer of an organic binder containing a liquid or semi-solid lubricant on that surface of a substrate remote from the magnetic recording layer. The lubricant oozing out of the back surface of the medium is transferred to the magnetic recording layer when the medium is wound in a roll form so that the lubricant is continuously fed to the surface of the magnetic recording layer. There are thus obtained excellent effects in the durability (abrasion, wear or separation resistance) and coefficient of dynamic friction of the magnetic recording layer. This type of magnetic recording medium utilizing continuous feed of lubricant from the backcoat layer to the magnetic thin film without a topcoat layer has a relatively high level of friction between the magnetic thin film and a magnetic head so that the movement of the medium is not satisfactorily smooth and the prevention of corrosion or rust of the magnetic thin film is still insufficient.

In the coating type of magnetic recording medium, topcoat layers are formed for the protection of the magnetic recording layer. Prior art topcoat layers are readily peeled off.

To obviate these drawbacks, the inventors previously proposed in Japanese Patent Application Nos. 59-15258, 59-15259, and 59-77583 a magnetic recording medium comprising a magnetic recording layer formed on a non-magnetic substrate wherein a topcoat layer of a specific composition is formed on the magnetic recording layer to thereby improve the dynamic properties and durability of the medium. We have found that the previously proposed topcoat layers are relatively readily peeled off because they are free of fine pigment particulates and thus cannot provide a cleaning effect to a head.

The present invention is based on our discovery that when the topcoat layer is observed under an electron microscope to contain submicron particulates of a pigment having a particle size of less than 200 Å in a linear distribution density or population of 10 to 1,000 per linear 100 $\mu$m and to have a surface roughness R20 of not more than 400 Å, there is obtained an improved magnetic recording medium which has eliminated the above-mentioned drawbacks while exhibiting superior properties including minimized head clogging, level down, dropout, friction, and abrasion as well as stable electromagnetic characteristics.

SUMMARY OF THE INVENTION

It is, therefore, an object of the present invention to provide a novel and improved magnetic recording medium having improved physical properties while retaining improved electromagnetic properties.

The present invention is directed to a magnetic recording medium comprising a non-magnetic substrate having opposed major surfaces, a magnetic recording layer formed on one major surface of the substrate, and a topcoat layer formed on the magnetic layer. According to the feature of the present invention, the topcoat layer contains a submicron particulate pigment observable under an electron microscope to have a linear distribution density of 10 to 1,000 per linear 100 $\mu$m and a particle size of less than 200 Å whereby the topcoat layer has a surface roughness R20 of not more than 400 Å. The surface roughness R20 used herein is defined by JIS B 0601 and will be explained in connection with the measurement of surface roughness in Examples.

DETAILED DESCRIPTION OF THE INVENTION

Topcoat

In order that the topcoat layer contains submicron pigment particulates observable under an electron microscope to have a linear distribution density of 10 to 1,000 per linear 100 $\mu$m and a particle size of less than 200 Å whereby the topcoat layer has a surface roughness R20 of not more than 400 Å, a topcoat composition may be used which contains submicron particulates of pigment having an average particle size of less than 200 Å, and preferably 20 to 200 Å and any one of the following procedures may be chosen.

[1] A topcoat composition having a varying content of pigment particulates having an average particle size of less than 200 Å is applied, passed through a drying oven, and cured by exposure to electron or ultraviolet radiation.

[2] A mixture of a compatible solvent and an incompatible solvent is used.

[3] A topcoat composition containing pigment particulates is applied and cured by exposure to electron or ultraviolet radiation without passing through a drying oven.

[4] A topcoat composition containing pigment particulates is applied while it is heated and maintained viscous.

[5] In procedures [1] or [3] mentioned above, the composition is passed through a drying oven or not and calender rolled in uncured condition prior to curing by electron or ultraviolet radiation.

[6] In procedure [5] mentioned above, the composition is passed through a drying oven or not, partially cured at a low dose of radiation (of the order of 0.01 to 2 Mrad), and calender rolled prior to curing by electron or ultraviolet radiation.

[7] In procedures [1] to [6] mentioned above, calender rolling may be added at the final stage.

When the topcoat layer is formed on the magnetic recording layer, magnetic recording layers of the coating type are improved in friction, magnetic powder drop, and durability and magnetic recording layers of the ferromagnetic thin film type are improved in rust prevention, corrosion resistance, durability, and moving smoothness. During repeated cycles of operation of topcoated magnetic recording medium, the topcoat layer is abraded away so that abraded debris will adhere and deposit onto the head. There often result clogging, output level-down, and dropout. This tendency is remarkable for those topcoats free of particulate pigments. The containment of particulate pigment eliminates clogging and output level-down and minimizes dropout because pigment particulates serve as an abrasive to scrape off deposits on the head, accomplishing a head cleaning effect.

Particulate pigment

When the topcoat layer contains a submicron particulate pigment observable under an electron microscope to have a linear distribution density of 10 to 1,000 per linear 100 $\mu$m and a particle size of less than 200 Å whereby the topcoat layer has a surface roughness R20 of not more than 400 Å, the resulting magnetic recording medium exhibits reduced spacing loss to the head, little reduction in electromagnetic characteristics, less friction and little abrasion in addition to the above-mentioned advantages.

When the number or population of electron-microscopically observable inorganic pigment particulates having a particle size of less than 200 Å is less than 10 per linear 100 $\mu$m, the head cleaning effect is too low to prevent adhesion or deposition of monomeric or polymeric substance to the head. On the other hand, when the number of electron microscopically observable inorganic pigment particulates having a particle size of less than 200 Å is more than 1,000 per linear 100 $\mu$m, head surface roughening or wear and topcoat abrasion are undesirably increased.

In the practice of the present invention, the topcoat layer may further contain an anti-oxidant and/or at least one member selected from monomers, oligomers and polymers. The inclusion of anti-oxidant contributes to the adhesion of the topcoat layer to the magnetic layer, reducing the peeling or abrasion of the topcoat layer. The presence of monomers, oligomers or polymers makes uniform the adhesive force of the anti-oxidant to the magnetic layer, eliminating minute irregularities and abrasion while further improving electromagnetic characteristics. Under temperature and humidity conditions, particularly under high-temperature and high humidity conditions, tape movement becomes more stable and topcoat abrasion or head deposition is minimized with little change in friction.

The submicron particulate pigments used in the practice of the present invention include $ZrO_2$, $Cr_2O_3$, $Al_2O_3$, $Y_2O_3$, $CeO_2$, $Fe_3O_4$, $Fe_2O_3$, $ZrSiO_4$, $Sb_2O_5$, $SnO_2$, $TiO_2$, etc.

The particulate pigments used herein should have a particle size of less than 200 Å. Pigment particulates having a particle size in excess of 200 Å result in increased spacing loss, increased output variation, and increased non-uniformity of the particulates in the topcoat layer, which all adversely affect signal reproduction, resulting in non-uniform distorted images.

Illustrative of the particulate pigments, for example, of $SiO_2$ are (1) colloidal solutions of silicic anhydride ultrafine particulates (Snowtex, a trade name of aqueous methanol silica sol, manufactured by Nissan Chemical K.K.) and (2) ultrafine anhydrous silica produced by pyrolysis of pure silicon tetrachloride (standard grade 100 Å, Aerosil, manufactured by Nihon Aerosil K.K.). Submicron particulates of such pigments as aluminum oxide and titanium oxide which can be used herein may also be available as (1) ultrafine particulate colloidal solutions or (2) ultrafine particulates produced by gas phase processes as above.

In addition to the anti-oxidant and the optional organic binder in the form of monomers, oligomers, and polymers mentioned above, the topcoat layer used in the practice of the present invention may further contain other additives commonly used in topcoats, for example, lubricants.

Carbon black may also be contained in the topcoat composition in order to reduce dropout. The carbon blacks used in the topcoat of the present invention may include furnace black, channel black, acetylene black, thermal black, lamp black and others produced by any well-known processes although acetylene black, furnace black, channel black, roller and disk black and naphthalene black (Degussa black) are preferred. The carbon blacks used herein may have a particle size of less than 400 Å, and preferably less than 200 Å as measured by electron photomicrography.

Anti-oxidant

Any anti-oxidants may be used in the topcoat layer as long as they can prevent oxidation of metals. The anti-oxidants used herein may be selected from conventional anti-oxidants which may be generally classified into the following groups:

(1) Phenolic anti-oxidants
(2) Amine anti-oxidants
(3) Phosphorous anti-oxidants
(4) Sulfur anti-oxidants
(5) Organic acid, alcohol and ester anti-oxidants
(6) Quinone anti-oxidants
(7) Inorganic acid and inorganic salt anti-oxidants.

Examples of each of these anti-oxidants are shown below.

(1) Phenolic anti-oxidants
2,6-di-tert-butyl-p-cresol,
2,6-di-tert-butylphenol,
2,4-dimethyl-6-tert-butylphenol,
butylhydroxyanisole,
2,2'-methylenebis(4-methyl-6-tert-butylphenol),
4,4'-butylidenebisS(3-methyl-6-tert-butylphenol), 4,4'-thiobis(3-methyl-6-tert-butylphenol),
tetrakis[methylene-3-(3,5-di-tert-butyl-4-hydroxy-
  phenyl)propionate]methane,
1,1,3-tris(2-methyl-4-hydroxy-5-tert-butylphenyl)bu-
  tane,
dibutylhydroxytoluene,
propyl gallate,
guaiacum resin,
nordihydroguaiaretic acid, etc.

Also included are phenolic anti-oxidants of radiation curable type, for example, acrylate and methacrylate modified compounds of monoglycol salicylate, 2,5-di-tert-butylhydroquinone, 2,4-dihydroxybenzophenone, 2,4,5-trihydroxybutyrophenone, hydroquinone, etc.

(2) Amine anti-oxidants
phenyl-β-naphthylamine,
α-naphthylamine,
N,N'-di-sec-butyl-p-phenylenediamine,
phenothiazine,
N,N'-diphenyl-p-phenylenediamine,
alkanol amines,
phospholipid, etc.

Also included are amine anti-oxidants of radiation curable type, for example, dimethylaminoethyl methacrylate and acrylate.

(3) Phosphorous anti-oxidants

Included are phosphate esters of both radiation curable and radiation uncurable types. The R moiety of phosphates may include alkyl radicals, alkyl phenyl radicals, ethylene oxide, propylene oxide, etc. and preferably contain 1 to 26 carbon atoms, and most preferably 1 to 22 carbon atoms. The phosphates include mono-, di-, and tri-esters and they may be used alone or in admixture. Mixtures comprising a major proportion of mono- and di-esters are preferred and the tri-esters may be excluded.

Also included in the phosphate esters are $NH_4$ type and methacrylate and acrylate modified types.

Illustrative examples include phosphites such as triphenyl phosphite, trioctadecyl phosphite, trilauryl trithiophosphite, etc.; hexamethyl phosphoric triamide, butyl phosphate, cetyl phosphate, butoxyethyl phosphate, 2-ethylhexyl phosphate, β-chloroethyl phosphate, butoxyethyl phosphate diethylamine salt, di(2-ethylhexyl) phosphate, ethyleneglycol acid phosphate; methacrylate and acrylate phosphates such as (2-hydroxyethyl) methacrylate phosphate, butylhydroxymethacrylate phosphate, caprylhydroxylmethacrylate phosphate, myristylhydroxymethacrylate phosphate, stearylhydroxymethacrylate phosphate, cetylhydroxymethacrylate phosphate, butylphenylhydroxymethacrylate phosphate, aminophenylhydroxymethacrylate phosphate, nonylphenylhydroxymethacrylate phosphate, and similar acrylate phosphates; phenyl phosphates such as phenyl phosphate and nonyl phosphate; alcoholic phosphates; vanadium series acidic phosphates, and the like.

The phosphate esters may be prepared by any well-known methods, for example, as disclosed in Japanese Patent Publication No. 57-44223.

(4) Sulfur anti-oxidants
dilaurylthiiodipropionate,
distearylthiodipropionate,
laurylstearylthiodipropionate,
dimyristylthiodipropionate,
distearyl-β,β'-thiobutyrate,
2-mercaptobenzoimidazole,
dilaurylsulfide, etc.

Also included are radiation curable methacrylate and acrylate modified compounds of
4,4'-thio-bis(3-methyl-6-tert-butylphenol),
2,2'-thio-bis(4-methyl-6-tert-bytylphenol), etc.

They may further contain ethylene oxide and propylene oxide units.

(5) Organic acid, alcohol, and ester anti-oxidants

Included are sorbitol, glycerine, propylene glycol, adipic acid, citric acid, ascorbic acid, etc. as well as radiation curable derivatives thereof.

(6) Quinone anti-oxidants

Included are hydroquinone, tocopherol, etc. as well as radiation curable derivatives thereof.

(7) Inorganic acid and inorganic salt anti-oxidants

Phosphoric acid is a typical example.

In order to minimize the conformity of the topcoat substance to the back surface morphology of the magnetic recording medium in a roll form, radiation curable anti-oxidants having an acrylic double bond in their molecule are preferred, for example, monoglycol salicylate methacylate and acrylate, 4-tert-butylcatechol methacrylate and acrylate, dimethylaminoethyl methacrylate and acrylate, ethylhydroxymethacrylate and acrylate phosphates, cetylhydroxyphosphate methacrylate and acrylate, stearyl methacrylate and acrylate phosphates, and phenyl derivatives of the foregoings, 2,2'-thio-bis(4-methyl-6tert-butylphenol) methacrylate and acrylate, etc.

The radiation curable anti-oxidants can be on-line cured to the ferromagnetic thin film during manufacturing, eliminating the deterioration of surface properties or output reduction due to subsequent heat curing which makes a roll tighter to cause the conformity of the topcoat substance to the back surface morphology. The use of the radiation curable anti-oxidants offers benefits in properties including prevention of dropouts and reduction of the output difference between outer and inner coils in a roll form, as well as the benefit of on-line production.

Lubricant

The lubricants used in the topcoat layer in the practice of the present invention may be conventional lubricants commonly used in prior art magnetic recording media, for example, silicone oil, fluorine oil, fatty acids, fatty acid esters, paraffins, liquid paraffins, and surface active agents, etc. Among others, preferred are fatty acids and/or fatty acid esters.

Examples of the fatty acids used herein include fatty acids having at least 12 carbon atoms, more illustratively, RCOOH where R is an alkyl having at least 11 carbon atoms, such as caprylic acid, capric acid, lauric acid, mirystic acid, palmitic acid, stearic acid, behenic acid, oleic acid, elaidic acid, linolic acid, linoleic acid, stearolic acid, etc. The fatty acid esters used herein may be those esters of monobasic fatty acids having 12 to 16 carbon atoms with monohydric alcohols having 3 to 12 carbon atoms, and those esters of monobasic fatty acids having at least 17 carbon atoms with monohydric alcohols, the esters having 21 to 23 carbon atoms in total. Also included are metal soaps of the foregoing fatty acids with alkali metals and alkaline earth metals as well as lecithin.

The silicone oils used herein may be fatty acid-modified silicones and partially fluorine-modified silicones. The alcohols used herein may be higher alcohols. The fluorine compounds may be those obtained by electrolytic substitution, telomerization, and oligomerization.

Also, lubricants of radiation curable type may be used and preferred. The use of the radiation curable lubricants prevents the transfer of the topcoat substances to the back surface of the medium in a roll form and thus offers benefits in properties including prevention of dropouts and reduction of the output difference between outer and inner coils in a roll form, as well as the benefit of on-line production.

The radiation curable lubricants are compounds having a chain moiety capable of providing lubricity and an acrylic double bond in their molecule, for example, acrylates, methacrylates, vinyl acetates, acrylamides, vinyl alcohol esters, methylvinyl alcohol esters, allylalcohol esters, glycerides, etc.

These lubricants may be represented by the following structural formulas:

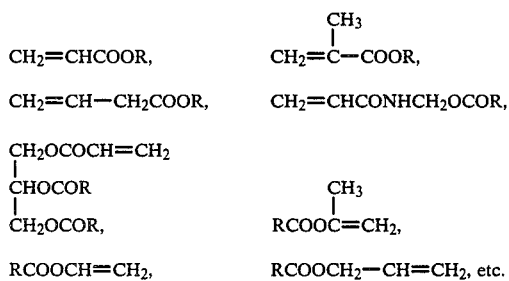

where R is selected from straight chain and branched, saturated and unsaturated, hydrocarbon radicals having at least 7 carbon atoms, preferably 12 to 23 carbon atoms. These compounds may be substituted with fluorine. The fluorine-substituted lubricants may be represented by the following structural formulas:

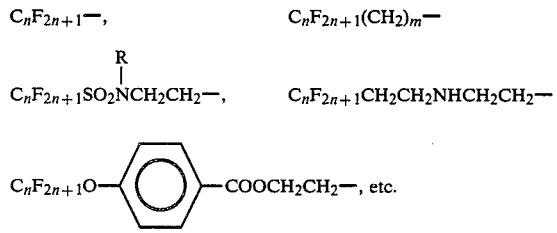

where m has a value from 1 to 5. Preferred examples of the radiation curable lubricants include stearic acid methacrylate and acrylate, methacrylate and acrylate of strearyl alcohol, glycerine methacrylate and acrylate, glycol methacrylate and acrylate, silicone methacrylate and acrylate, etc.

Binder

The binders used in the topcoat layers in the practice of the present invention may take the form of monomers, oligomers or polymers and be selected from thermoplastic, thermosetting and reactive-type resins which have been commonly used in prior art magnetic recording media, and mixtures thereof. Among them, thermosetting resins, and especially radiation curable resins are preferred because of the strength of the resultant coating.

The thermoplastic resins used herein are resins having a softening point of lower than 150° C., an average molecular weight of 10,000 to 200,000, and a polymerization degree of about 200 to 2,000, for example, vinyl chloride-vinyl acetate copolymers (which may have carboxylic units incorporated therein), vinyl chloride-vinyl acetate-vinyl alcohol copolymers (which may have carboxylic units incorporated therein), vinyl chloride-vinylidene chloride copolymers, vinyl chloride-acrylonitrile copolymers, acrylate-acrylonitrile copolymers, acrylate-vinylidene chloride copolymers, acrylate-styrene copolymers, methacrylate-acrylonitrile copolymers, methacrylate-vinylidene chloride copolymers, methacrylate-styrene copolymers, urethane elastomers, nylon-silicon resins, nitrocellulose-polyamide resins, polyfluorovinyl resins, vinylidene chloride-acrylonitrile copolymers, butadiene-acrylonitrile copolymers, polyamide resins, polyvinyl butyral, cellulose derivatives (such as cellulose acetate, cellulose diacetate, cellulose triacetate, cellulose propionate, nitrocellulose, etc.), styrene-butadiene copolymers, polyester resins, chlorovinyl ether-acrylate copolymers, amino resins, various synthetic rubber series thermoplastic resins, and mixtures thereof.

The thermosetting and reactive-type resins are resins which have a molecular weight of less than 200,000 in solution form to be applied, and after being applied, dried, and heated, have an infinitely increased molecular weight as a result of condensation and addition reactions. Among them, preferred are those resins which do not soften or melt before they are pyrolyzed.

Illustrative of these resins are phenol resins, epoxy resins, polyurethane setting resins, urea resins, melamine resins, alkyd resins, silicone resins, acrylic resins, acrylic reactive resins, epoxy-polyamide resins, nitrocellulose melamine resins, mixtures of high molecular weight polyester resins and isocyanate prepolymers, mixtures of methacrylate copolymers and diisocyanate prepolymers, mixtures of polyester polyols and polyisocyanates, urea-formaldehyde resins, low molecular weight glycol/high molecular weight diol/triphenylmethane triisocyanate mixtures, polyamine resins, and mixtures thereof.

Among them particularly preferred are thermosetting resin compounds comprising a cellulosic resin (pyroxylin etc.), a vinyl chloride-vinyl acetate-vinyl alcohol copolymer, and urethane with a curing agent added. Also preferred are radiation-curable resin compounds comprising a vinyl chloride-vinyl acetate-vinyl alcohol copolymer (which may have carboxylic units incorporated therein) or acrylic-modified vinyl chloride-vinyl acetate-vinyl alcohol copolymer (which may have carboxylic units incorporated therein) and urethane acrylate.

In addition to the above preferred combinations, also preferred are those thermoplastic resins having contained or incorporated in their molecule radicals susceptible to crosslinking or polymerization upon exposure to radiation, for example, acrylic double bonds as given by acrylic and methacrylic acids having an unsaturated double bond capable of radical polymerization or esters thereof; allyl double bonds as given by diallyl phthalate; and unsaturated bonds as given by maleic acid and maleic derivatives.

Monomers which can be used as the binder component in the practice of the present invention include acrylic acid, methacrylic acid, and acrylamide.

Those binders having a double bond may be obtained by modifying various polyesters, polyols, polyurethanes and analogues with compounds having an acrylic double bond. If desired, polyhydric alcohols or polyhydric carboxylic acids may be blended to obtain compounds having varying molecular weights.

The foregoing examples are only a part of the radiation sensitive resins used herein. They may also be used alone or in admixture.

The radiation curable monomers, oligomers, and polymers used in the topcoat layer in the practice of the present invention include monomers, oligomers, and polymers having a group capable of crosslinking or polymerization upon exposure to radiation contained or incorporated in their molecule, for example, acrylic acid and methacrylic acid having an unsaturated double bond sensitive to ionization energy and capable of radical polymerization, compounds having an acrylic double bond such as esters of acrylic acid and methacrylic acid, compounds having an allyl double bond such as diallyl phthalate, and compounds having an unsaturated bond such as maleic acid and its derivatives.

The radiation curable monomers may have a molecular weight of less than 2,000 and the radiation curable oligomers may have a molecular weight of 2,000 to 10,000. Examples of the monomers and oligmers include styrene, ethyl acrylate, ethylene glycol diacrylate, ethlylene glycol dimethacrylate, diethylene glycol diacrylate, diethylene glycol dimethacrylate, 1,6-hexaneglycol diacrylate, 1,6-hexaneglycol dimethacrylate, etc. More preferred examples include N-vinyl pyrrolidone, pentaerythritol tetraacrylate (methacrylate), pentaerythritol triacrylate (methacrylate), trimethylolpropane triacrylate (methacrylate), trimethylolpropane diacrylate (methacrylate), polyfunctional oligoester acrylates (Aronix M-7100, M-5400, 5500, and 5700, manufactured by Toa Synthesis K.K.), acryl-modified products of urethane elastomers (Nippolane 4040, manufactured by Nihon Polyurethane K.K.), and derivatives thereof having a functional group such as COOH incorporated therein, arcylates (methacrylates) of phenol ethylene oxide adducts, and compounds comprising pentaerythrytol condensed rings of the following formula having an acryl or methacryl group or ε-caprolacton-acryl group.

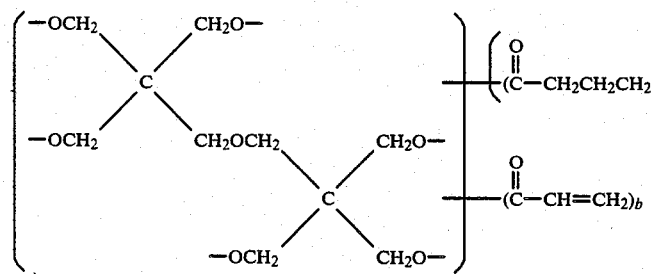

Those compounds having the above formula where
m=1, a=2, and b=4 are designated special pentaerythritol condensates A,
those where m=1, a=3, and b=3 are designated special pentaerythritol condensates B,
those where m=1, a=6, and b=0 are designated special pentaerythritol condensates C, and
those were m =2, a=6, and b=0 are designated special pentaerythritol condensates D, hereinafter.
Also included are special acrylates having the following general formulas.

$$(CH_2=CHCOOCH_2)_3—CCH_2OH \quad (1)$$

(special acrylate A)

$$(CH_2=CHCOOCH_2)_3—CCH_2CH_3 \quad (2)$$

(special acrylate B)

$$[CH_2=CHCO—(OC_3H_6)_n—OCH_2]_3—CCH_2CH_3 \quad (3)$$
(n ≃ 3)

(special acrylate C)

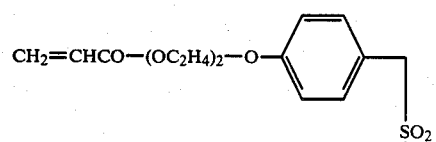

(special acrylate D)

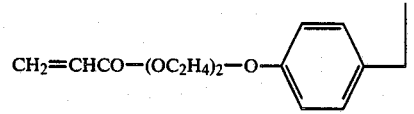

(special acrylate E)

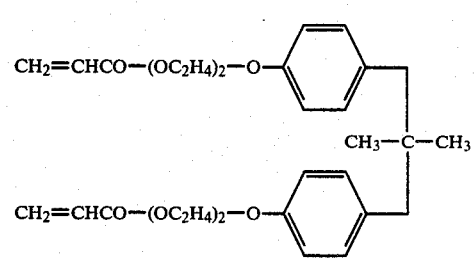

(special acrylate F)

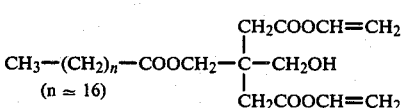

(special acrylate G)

$$CH_2=CHCOO—(CH_2CH_2O)_4—COCH=CH_2 \quad (8)$$

(special acrylate H)

-continued

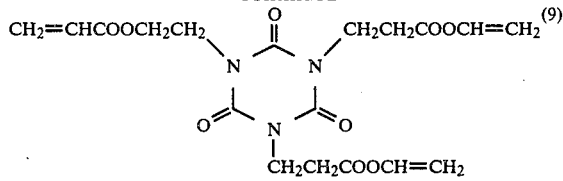

(special acrylate I)

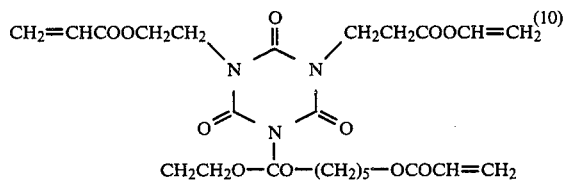

(special acrylate J)

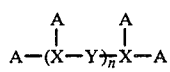

(special acrylate K)

A: acrylic acid
X: polyhydric alcohol
Y: polybasic acid

Examples of the radiation curable oligomers include acrylate-modified urethane elastomers and polyfunctional oligoester acrylates having the following general formula:

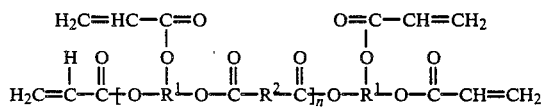

where $R^1$ and $R^2$ are alkyl and n is an integer.

The use of at least one organic binder selected from the foregoing monomers, oligomers, and polymers reinforces the topcoat layer, that it, increases the breakage strength and abrasion resistance of the topcoat layer, resulting in stable movement in high-temperature and high-humidity conditions. There is thus obtained a magnetic recording medium which is improved in dropout, head adhesion, topcoat abrasion, and friction variation with use. The use of radiation curable binders allows the topcoat to be continuously formed on a manufacturing line, contributing to energy and cost savings.

The proportion of additives used in the topcoat layer may be controlled such that the ratio of organic binder to anti-oxidant ranges from 0:100 to 90:10, and preferably from 0:100 to 70:30 by weight. The lubricant may be added in amounts of from 0.5 to 300 parts by weight per 100 parts by weight of the organic binder plus anti-oxidant. The carbon black may be blended such that the ratio of carbon black to particulate pigment ranges from 1/9 to 8/2, and preferably from 1/9 to 5/5.

The presence of the organic binder in the practice of the present invention increases the adhesive force of anti-oxidant to the magnetic layer to mitigate abrasion, head clogging, output level-down, and dropout.

The topcoat layer may preferably have a thickness of 5 to 800 Å. Thicker topcoat layers detract from electromagnetic characteristics and tend to be abraded away. Too thin topcoat layers result in head clogging. For the ferromagnetic thin film, topcoat layers having a thickness of less than 450 Å are preferred. In general the ferromagnetic thin film without a topcoat should preferably have a surface roughness of 100 Å or less. When the topcoat layer is formed on such a ferromagnetic thin film, too thick topcoat layers can be abraded or worn. Too thin topcoat layers are too weak in bonding force, often resulting in head clogging. We have first discovered this fact. The preferred thickness range is between 5 Å and 450 Å, and especially between 10 Å and 300 Å.

As described above, the topcoat layer is 5 to 800 Å thick while the pigment particulates contained therein have a particle size of less than 200 Å. It is not critical to the invention whether the pigment particulates are covered with the topcoat material or exposed at the topcoat surface. The particulates are often exposed or protruded at the topcoat surface with or without coating.

Magnetic layer

The magnetic layer formed on the magnetic recording medium according to the present invention may be either (1) coating type comprising coated films containing ferromagnetic fine particles and a binder or (b) metal thin film type comprising ferromagnetic metal thin films. The ferromagnetic substances may be selected from $\gamma$-$Fe_2O_3$, $Fe_3O_4$, cobalt-doped $\gamma$-$Fe_2O_3$, cobalt-doped $\gamma$-$Fe_2O_3$-$Fe_3O_4$ solid solution, cobalt base compound-coated $\gamma$-$Fe_2O_3$, cobalt base compound-coated $\gamma$-$Fe_3O_4$ including intermediate oxide form between $\gamma$-$Fe_2O_3$ and $\gamma$-$Fe_3O_4$ the cobalt base compounds used herein include cobalt oxide, cobalt hydroxide, cobalt ferrite, cobalt ion adsorbed substances and the other compound which can utilize the magnetic anisotropy of cobalt for coercive force improvement); and ferromagnetic metal elements such as iron, cobalt and nickel, and ferromagnetic alloys such as Fe-Co, Fe-Ni, Co-Ni, Fe-Rh, Fe-Cu, Fe-Au, Co-Cu, Co-Au, Co-Y, Co-La, Co-Pr, Co-Gd, Co-Sm, Co-Pt, Ni-Cu, Fe-Co-Nd, Mn-Bi, Mn-Sb, Mn-Al, Fe-Co-Cr, Co-Ni-Cr, etc. and ferromagnetic ferrites such as Ba ferrite and Sr ferrite.

Ferromagnetic powders commonly used in the prior art are, for example, $\gamma$-$Fe_2O_3$, cobalt-doped $\gamma$-$Fe_2O_3$, $Fe_3O_4$, cobalt-doped $Fe_3O_4$, and $CrO_2$. These ferromagnetic powders have insufficient magnetic characteristics such as maximum residual magnetic flux density for high sensitivity, high density recording, and are rather unsuitable in the recording of signals having a short wavelength of less than about 1 $\mu$m and recording with a narrow track width.

With the increasingly severer demand on magnetic recording media, ferromagnetic powders having characteristics adequate for high density recording have been developed and proposed. Typical of such newly developed ferromagnetic powders are metals and alloys such as Fe, Co, Fe-Co, Fe-Co-Ni, Co-Ni, etc. and alloys thereof with Al, Cr, Si, etc. Since magnetic recording layers formed of these alloy powders should have high coercive force and residual flux density for the purpose of high density recording, preparation methods and alloy compositions should preferably be selected so that the resulting magnetic powders will meet the requirements.

With respect to magnetic alloy powders, we have prepared magnetic recording media using various alloy powders to find that when alloy powders having a specific surface area of at least 48 m²/g as measured by BET method are used to form a magnetic layer having a coercive force of at least 1,000 Oe and a surface roughness of not more than 0.08 μm (as expressed in R20 or twenty-point average surface roughness given by measurement in Talystep with a cutoff value of 0.17 mm as will be described hereinafter), there is obtained an improved magnetic recording medium having a sufficiently reduced noise level suitable for high-density, short-wavelength recording. When these magnetic layers are combined with the topcoat layers according to the present invention, cinching phenomenon (loosening upon quick stopping) is eliminated and dropout and friciton are reduced. In general, the substrate used for the magnetic recording tape is a plastic film of polyethylene terephthalate, polyethylene naphthalate, polyimide, polyamide, etc. which is as thin as about 11 μm or less, and a roll of tape tends to tighten up during roll winding. When the tape has a backcoat layer, the irregular morphology of the backcoat layer is transferred to the surface of the magnetic layer during tightening of the roll, resulting in an output reduction. This problem is also mitigated or eliminated by the combination of the above-mentioned magnetic layer with the topcoat layer according to the present invention. It should be noted that ferromagnetic materials primarily based on ferromagnetic metals require an anti-static treatment because the coated film has a high electric resistance and tends to generate more dropouts. The application of the topcoat layer according to the present invention eliminates such a problem. That is, the present invention allows such desirable magnetic powders to be used in magnetic recording media.

The magnetic recording layers as mentioned above preferably have a coercive force in the range from 1,000 to 2,000 Oe. Beyond this range, the magnetic head is saturated during recording operation and thus becomes difficult to demagnetize. Larger the specific surface area of magnetic powder, the more is improved the S/N ratio. However, magnetic powders having an extremely large specific surface area are difficult to disperse in a binder matrix and the effect by specific surface area is saturated at a certain level. On the other hand, the surface roughness of the magnetic recording layer affects the recording density thereof and a reduction in surface roughness results in increased recording density at shorter wavelengths. Examples of the ferromagnetic alloys capable of satisfying these considerations include Co, Fe-Co, Fe-Co-Ni, Co-Ni, and similar cobalt alloys with or without Cr, Al, Si, etc. added thereto. These powders are fine powders obtained by reducing metal salts with a reducing agent such as $BH_4$ in wet conditions, fine powders obtained by coating the surface of iron oxide with silicon compounds followed by dry reduction in $H_2$ gas, and fine powders obtained by evaporating alloys in low pressure argon. These fine powders should have an aspect ratio between 1:5 and 1:10 and a residual magnetic flux density Br of 2,000 to 3,000 Gauss while satisfying the above-mentioned requirements of coercive force and specific surface area.

The magnetic alloy powders may be dispersed in various binders to form magnetic paint compositions. In general, thermosetting resin binders and radiation curable resin binders are preferred which may further contain additives such as dispersants, lubricants, and anti-static agents in a conventional manner. The magnetic powders generally employed in the practice of the invention have a BET specific surface area of at least 48 m²/g and are somewhat difficult to disperse. The use of dispersants is thus recommended, for example, surface active agents, organic titanium coupling agents, and silane coupling agents. Preferred examples of the binders include binders of vinyl chloride-vinyl acetate-vinyl alcohol copolymers, urethane prepolymers, polyisocyanates, and optionally nitrocellulose, and other well-known thermosetting binders, and radiation curable binders of resins having acrylic or maleic double bonds sensitive to ionization energy.

The magnetic alloy powder is blended with a binder, a suitable solvent, and optional additives in a conventional manner to obtain a magnetic paint composition which is then applied to a substrate such as a polyester film, cured through the application of heat or radiation to form a cured magnetic film, and then calender rolled.

The use of radiation curable binders is more advantageous because they are continuously cured during manufacture so that the transfer of the back morphology to the magnetic layer is substantially eliminated to minimize dropouts. In addition, radiation curing is carried out on a manufacturing line, which saves energy consumption and labor during manufacture, leading to cost reductions. Benefits in properties are also expected, for example, prevention of dropout development which is otherwise caused by roll tightening during heat curing, and elimination of the output difference between outer and inner coils of a roll which is caused by a local pressure difference. Since the substrate film is as thin as about 11 μm or less and the magnetic metal powder has a lower hardness than magnetic oxides like $\gamma$-$Fe_2O_3$, the resulting magnetic layer having a lower surface hardness tends to be affected by roll tightening. The use of radiation curable binders advantageously eliminates such influence so that little difference occurs in output and dropout between inner and outer coils of a roll.

For the ferromagnetic thin films which are used in the practice of the present invention, ferromagnetic metals and alloys may be employed, for example, iron, cobalt, nickel and other ferromagnetic metal elements. The preferred ferromagnetic alloys are Fe-Co, Fe-Ni, Co-Ni, Fe-Rh, Fe-Cu, Fe-Au, Co-Cu, Co-Au, Co-Y, Co-La, Co-Pr, Co-Gd, Co-Sm, Co-Pt, Ni-Cu, Fe-Co-Nd, Mn-Bi, Mn-Sb, Mn-Al, Fe-Co-Cr, and Co-Ni-Cr.

The ferromagnetic thin films may be applied onto non-magnetic substrates, for example, plastic films such as polyester and polyamide films, metal plates such as aluminum and stainless steel plates, and inorganic plates such as glass plates, with or without an intervening non-magnetic thin film layer by applying the desired metals or alloys by vacuum deposition, sputtering, ion plating, plating or any other desired processes.

Any ferromagnetic thin films prepared by the above-mentioned processes may, of course, be used in the practice of the present invention. A first, less preferred, example is a ferromagnetic thin film which is prepared, as described in Example 5 of Japanese Patent Publication No. 57-29769, by carrying out evaporation in a vacuum of $5.0 \times 10^{-5}$ Torr while the width direction is at an angle of 50° with respect to an evaporation source. A second, more preferred, example is a ferromagnetic thin film which is prepared in a currently prevalent process by carrying out evaporation in a vacuum of approximately $1 \times 10^{-4}$ Torr in an atmosphere where $O_2$ or $O_2$ and Ar are continuously fed while the evaporation direction is at an angle of 90° to 30° with respect to the longitudinal direction, but aligned with the width direction.

The evaporated film prepared by the first process mentioned above is metallic throughout and over the film (except the surface which is spontaneously oxidized immediately after being taken out into air). The film prepared by the second process, that is, by evaporating a metal or alloy in vacuum in the presence of a minor proportion of oxygen gas, is formed of a magnetic metal(s) containing oxygen which does not form a solid solution with the metal, but is present as oxides. The presence of oxides of this type is preferable. Particularly when oxides are rich in the interface with the substrate and the surface of the magnetic layer remote from the substrate, the magnetic layer exhibits excellent properties.

The process of introducing oxygen into ferromagnetic metal thin films is not limited to the above-mentioned evaporation in the presence of oxygen. A deposited film obtained by vacuum deposition in the absence of oxygen may be forcedly oxidized in an atmosphere at a temperature of 90° C. and a relative humidity of 20% such that the surface portion of the magnetic layer remote from the substrate consists of oxides. The oxygen-containing ferromagnetic thin films has an oxygen content of 3 to 60% calculated as $O/M \times 100\%$ where M is a ferromagnetic metal.

The topcoat layer containing the particulate pigment, at least one of monomeric, oligomeric, and polymeric binders, antioxidant, lubricant, and optional additives may be formed on the surface of the magnetic recording layer by any suitable methods, for example, by diluting the ingredients in a solvent and thinly applying the resulting dispersion onto the layer surface, or evaporating the ingredients in air, inert gas or vacuum and directing the resulting vapor to the layer surface.

When radiation curable additives are used in the magnetic layer and/or the topcoat layer in the practice of the present invention, various active energy radiations may be used for inducing crosslinking, for example, electron radiation emitted from a radiation accelerator, $\gamma$-ray emitted from a source of Co60, $\beta$-ray emitted from a source of Sr90, X-ray emitted from an X-ray generator, and ultraviolet radiation. Particularly preferred radiation for exposure is radiation generated by a radiation accelerator because of easy dose control, simple incorporation in a manufacturing line, and electromagnetic radiation shielding.

Although a backcoat layer is not necessarily required in the magnetic recording medium of the present invention, the provision of a backcoat layer advantageously stabilizes the movement of the medium. The backcoat layer may contain inorganic pigments, lubricants, organic binders, and other additives which are commonly employed for the purpose.

As described above, according to the feature of the present invention, the topcoat layer contains a submicron particulate pigment observable under an electron microscope to have a linear distribution density of 10 to 1,000 per linear 100 μm and a particle size of less than 200 Å whereby the topcoat layer has a surface roughness R20 of not more than 400 Å. In addition to the rust prevention, corrosion prevention, durability and moving stability which are ordinarily accomplished by the provision of a topcoat, the topcoat of the present invention provides advantages of reduced spacing loss to the head, less deterioration of electromagnetic characteristics, low friction, and low abrasion. The inclusion of the anti-oxidant and organic binder in the topcoat composition enhances the bonding force of the topcoat layer to the magnetic layer, providing additional advantages of stable movement in high temperature, high humidity environment, less abrasion of the topcoat, and less variation of friction.

The magnetic recording medium of the present invention is applicable in a wide variety of uses as audio tape, video tape, computer tape, endless tape, magnetic disks, and magnetic camera disks. The magnetic recording medium is particularly useful as video tape, computer tape, and video disks wherein dropout is one of the most important factors. Particularly for video cassette tapes experiencing a remarkable technical advance and spreading its market, master tapes for the contact transfer printing of video tapes, and 8-mm video cassette tapes expected to have a spreading market, the provision of the fine particulate pigment-containing topcoat layer as specified in the present invention affords high performance tape having improved electromagnetic characteristics and reliable physical properties. The magnetic recording medium of the present invention thus has great utility in the art.

EXAMPLES

Examples of the present invention are presented below by way of illustration and not by way of limitation.

The molecular weight of oligomers and polymers used in the present invention is a number average molecular weight as measured by the following G.P.C. process.

Measurement of number average molecular weight by G.P.C.

The gel permeation chromatography (G.P.C.) is a liquid chromatography process of the type using a column filled with porous gel serving as a molecular sieve for separating molecules in a sample in terms of their dimensions in a mobile phase. The average molecular weight may be determined by passing a polystyrene having a predetermined molecular weight as a reference sample to depict a calibration curve on the basis of elution time. Then the average molecular weight is calculated on the polystyrene basis. If a given high molecular weight substance contains Ni molecules having a molecular weight Mi, then the number average molecular weight Mn is represented by the equation:

$$Mn = \frac{\Sigma N_i M_i}{\Sigma N_i}$$

Physical properties are measured by the following procedures.

Surface Roughness R20

The twenty-point mean surface roughness R20 has the same definitions and designation as the ten-point mean surface roughness Rz by JIS B 0601-1982 with the exception of increasing the number of measurement points from ten to twenty. The terms, surface roughness, profile, reference length of profile, roughness curve and cut-off value, mean line of profile, and profile peak and valley are as defined in the standard.

The twenty-point mean roughness shall be the value of difference, being expressed in micrometer (μm), between the mean value of altitudes of peaks from the highest to the 10th, measured in the direction of vertical magnification from a straight line that is parallel to the mean line and that does not intersect the profile, and the mean value of altitudes of valleys from the deepest to the 10th, within a sampled portion, of which length corresponds to the reference length, from the profile.

The profile may be depicted by means of a probe meter, for example.

The twenty-point mean roughness R20 is given by the following equation:

$$R20 = [(R_1+R_2+R_3+R_4+R_5+R_6+R_7+R_8+R_9+R_{10}) - (R_{11}+R_{12}+R_{13}+R_{14}+R_{15}+R_{16}+R_{17}+R_{18}+R_{19}+R_{20})]/10$$

wherein $R_1$ to $R_{10}$ are altitudes of peaks from the highest to the 10th for the sampled portion corresponding to the reference length L, and $R_{11}$ to $R_{20}$ are altitudes of valleys from the deepest to the 10th for the sampled portion corresponding to the reference length L. The reference length L varies with the range of the twenty-point mean roughness R20 and it is also in conformity to the standard.

The probe-type surface roughness meter used herein is Talystep-1 manufactured by Taylor Hobson Company. The probe having a tip size of 0.1×2.5 μm was operated under a load of 2 mg with a cut-off value of the order of 0.18 to 9 Hz (166.7 μm to 3.3 μm) at a probe speed of 30 μm/sec.

Clogging

A commercially available VHS type video tape recorder is modified such that its head may be readily clogged.

Dropout (DO)

A commercially available VHS type video tape recorder is modified such that it causes dropouts to occur. Signals having a frequency of 5 MHz are recorded and reproduced under the given temperature and humidity. The number of those reproduced signals which are kept for at least 15 μsec. lower than the average reproduction level by at least 18 dB is counted per minute on ten (10) samples.

Output variation

Variations in the output were measured at the same time as the dropout measurement.

Head adhesion, topcoat abrasion and surface roughening

A commercially available VHS video tape recorder was modified and tape samples were moved 50 passes at the given temperature and humidity. The head was observed by photomicroscopy for the adhesion or deposition of tape debris. The topcoat of the tape was also observed by photomicroscopy for abrasion. The surface of the magnetic layer was also observed by photomicroscopy for surface roughening.

Average particle size and particle number

The topcoat layer was observed under a scanning electoron microscope with an accelerating voltage of 0.5 to 20 keV and a magnifying power of 10,000 to 100,000. The average particle size of pigment particulates in the topcoat was estimated by sampling ten (10) particulates in a range of 100 μm. Where particulates are agglomerated, the primary particle size was measured.

The number of particulates was counted over a linear length of 100 μm. Ten counts are averaged.

(1) Formation of magnetic layer

Magnetic layer 1 (radiation cured magnetic layer)

| Ingredient | Parts by weight |
| --- | --- |
| Needle cobalt-coated γ-Fe₂O₃ (major axis 0.4μ, minor axis 0.05μ, Hc 600 Oe) | 120 |
| Carbon black* | 5 |
| α-Al₂O₃ powder (particle size 0.5 μm) | 2 |
| Dispersant (lecithin purified from soybean oil) | 3 |
| Solvent (MEK/toluene 50/50) | 100 |

*anti-static Mitsubishi Carbon Black MA-600 available from Mitsubishi Chemicals K.K.

The above ingredients are mixed in a ball mill for three hours to fully wet the needle magnetic iron oxide with the dispersant. Separately, the following ingredients are thoroughly mixed to obtain a binder solution.

| Ingredient | Parts by weight |
| --- | --- |
| Saturated polyester resin having acrylic double bond incorporated | 10 (solids) |
| Vinyl chloride-vinyl acetate copolymer having acrylic double bond incorporated | 10 (solids) |
| Polyether urethane elastomer having acrylic double bond incorporated | 10 (solids) |
| Solvent (MEK/toluene 50/50) | 200 |
| Lubricant (higher fatty acid-modified silicone oil) | 3 |

The binder solution is poured in the ball mill where the magnetic powder has been treated and the contents are milled for dispersion for a further 42 hours.

The thus obtained magnetic paint composition is applied onto a polyester film of 15 μm thick, oriented on a permanent magnet (1600 Gauss), dried by evaporatinig the solvent under infrared lamps or with hot air, and smoothened on the surface. Then the coating is cured through exposure to electron radiation in a nitrogen atmosphere using an electro-curtain type electron ray accelerator (manufactured by Energy Science Inc.) under conditions: accelerating voltage 150 keV, electrode current 20 mA, and a total dose 5 Mrad.

Magnetic layer 2

| Ingredient | Parts by weight |
| --- | --- |
| Fe—Co—Ni alloy powder (Hc 1,200 Oe, major axis 0.4 μm, minor axis 0.05 μm, BET specific surface area 52 m²/g) | 100 |
| Vinyl chloride-vinyl acetate-vinyl alcohol copolymer (VAGH available from U.C.C.) | 15 |
| Polyvinyl butyral resin | 10 |
| Urethane having acrylic double bond incorporated | 10 |
| Methyl ethyl ketone/toluene 50/50 | 250 |

The above ingredients are thoroughly milled and the resulting composition is applied onto a polyester film to a thickness of 3.5 μm, exposed to electron radiation for curing, and then calender rolled.

Magnetic layer 3 (Ferromagnetic thin film 1)

A polyester film of 12 μm thick was moved along the circumferential surface of a cooled cylindrical can in a chamber which was evacuated to a vacuum of $1.0 \times 10^{-4}$ Torr A 1:1 (by volume) mixture of $O_2$ and Ar was passed through the chamber at a flow rate of 800 cc/min. A 80/20 Co/Ni alloy was melted in the chamber and evaporated toward the substrate within the range of incident angle between 90° and 30° by the oblique evaporation technique. There was formed a Co-Ni-O thin film of 0.15 μm thick on the substrate.

Oxygen was locally concentrated at the interface with the substrate and the surface of the magnetic film remote from the substrate. The surface of the magnetic layer from the substrate was substantially completely covered with oxides. The magnetic film had a coercive force Hc=1,000 Oe. The average quantity of oxygen in the magnetic film was 40% as expressed by its atomic ratio to Co and Ni, that is, $O/(Co+Ni) \times 100$.

Magnetic layer 4 (Ferromagnetic thin film 2)

A ferromagnetic thin film 2 was prepared in the same manner as for ferromagnetic thin film 1 except that a 12-μm thick polyester film was moved along the circumferential surface of a cooled cylindrical can in a chamber which was evacuated to a vacuum of $5.0 \times 10^{-6}$ Torr. There was formed a thin film consisting essentially of Co-Ni and having a thickness of 0.15 μm.

The resulting tape was forcedly oxidized in an atmosphere at 90° C. and RH 20% such that the surface of the magnetic film remote from the substrate consisted of oxides. The magnetic film had a coercive force Hc of 900 Oe. The average quantity of oxygen in the magnetic film was 45% as expressed by its atomic ratio to Co and Ni.

Magnetic layer 5 (Ferromagnetic thin film 3)

A ferromagnetic thin film 3 was prepared by the same evaporation process as for ferromagnetic thin film 1 except that a 12-μm thick polyester film was moved along the circumferential surface of a cooled cylindrical can in a chamber which was evacuated to a vacuum of $5.0 \times 10^{-6}$ Torr. The oxidizing treatment with oxygen as done for ferromagnetic thin film 2 was omitted. There was formed a thin film consisting essentially of Co-Ni and having a thickness of 0.15 μm and a coercive force Hc=950 Oe.

(2) Formation of topcoat layer

| Ingredient | Parts by weight |
| --- | --- |
| Topcoat composition 1 | |
| Dimethylaminoethyl methacrylate | 0.5 |
| Colloidal SiO2, particle size 100 Å | 0.001 |
| Fluoride-modified stearic acid silicone | 0.4 |
| Methyl ethyl ketone | 100 |
| Topcoat composition 2 | |
| Stearyl (2) hydroxyacrylate phosphate (mono/di mixture) | 0.5 |
| Colloidal TiO2*, particle size 100 Å | 0.04 |
| Stearic acid acrylate | 0.5 |
| Myristyl myristylate | 0.1 |
| MEK/toluene (1/1) | 100 |

*prepared by process (1) previously mentioned.

| Ingredient | Parts by weight |
| --- | --- |
| Topcoat composition 3 | |
| Hydroxyethyl methacrylate | 1 |
| Colloidal TiO2*, particle size 180 Å | 0.001 |
| Myristic acid | 0.2 |
| Toluene | 100 |

*prepared by process (1) previously mentioned.

| Ingredient | Parts by weight |
| --- | --- |
| Topcoat composition 4 | |
| Dimethylaminoethyl methacrylate | 1.5 |
| Cr2O3*, particle size 180 Å | 0.01 |
| Phenoxy-modified product, MW 30,000 | 0.2 |
| Acryl-modified polyurethane elastomer MW 4,000 | 0.1 |
| Polyfunctional acrylate, MW 500 | 0.1 |
| Stearic acid acrylate | 1 |
| MEK/toluene (1/1) | 100 |

*prepared by gas phase process (2) previously mentioned.

| Ingredient | Parts by weight |
| --- | --- |
| Topcoat composition 5 | |
| Monoglycol salicylate acrylate | 2.5 |
| SiO2*, particle size 100 Å | 0.002 |
| Pentaerythritol tetraacrylate, MW 352 | 0.6 |
| N—vinylpyrrolidone, MW 111 | 0.3 |
| MEK/toluene (1/1) | 100 |

*prepared by gas phase process (2) previously mentioned.

EXAMPLE 1

(magnetic layer 1/topcoat composition 1)

The concentration of the topcoat lacquer was adjusted by mixing dimethylaminoethyl methacrylate and fluoride-modified stearic acid silicone in a ratio of 0.5:0.4 and a topcoat layer having a thickness of 600 Å was formed. The surface roughness of the topcoat layer was adjusted in the range of 10 to 600 Å by varying application parameters.

The topcoat layers thus obtained were observed under an electron microscope. The number of pigment particulates having a particle size of less than 200 Å and surface roughness R20 are shown in Table I together with the physical properties of the topcoat layers.

TABLE I

| Pigment particulates, /100 μm | 5 | 10 | 100 | 500 | 1000 | 2000 |
| --- | --- | --- | --- | --- | --- | --- |
| Surface roughness R20 | 200 | 100 | 200 | 300 | 400 | 600 |
| Properties (40° C., RH 80%, 50 passes) | | | | | | |
| Head adhesion | moderate | no | no | no | slight | marked |
| Head clogging | marked | no | no | no | slight | marked |
| Output reduction | slight | slight | slight | slight | moderate | marked |
| Topcoat abrasion | marked | no | no | no | slight | marked |
| Surface roughening | moderate | no | no | no | no | marked |
| Dropouts, /min. | 300 | 40 | 40 | 40 | 70 | 500 |
| Coefficient of friction | | | | | | |
| Initial | 0.30 | 0.25 | 0.25 | 0.25 | 0.21 | 0.19 |
| After 50 passes | 0.52 | 0.32 | 0.32 | 0.30 | 0.30 | 0.50 |
| Preparation process | [5] | [5] | [5] | [5] | [1] | [1] |

The following conclusions are derived from the data in Table I.

(1) Those topcoat layers containing 10 to 1,000 SiO2 particulates per linear 100 μm as observed under an electron microscope are excellent in head adhesion, head clogging, output variation, topcoat abrasion, surface roughening, dropout, and friction.

(2) Those topcoat layers having a surface roughness R20 of 400 Å or less exhibit low friction and favorable head cleaning effect while retaining improved head adhesion, head clogging, output variation, topcoat abrasion, surface roughening, and dropout.

(3) The topcoat layer containing 2,000 SiO2 particulates per linear 100 μm as observed under an electron microscope has a higher surface roughness R20. The topcoat is remarkably abraded or worn away and becomes poor in head adhesion, head clogging, output variation, and dropout. Because of substantial head adhesion and topcoat abrasion, the friction is remarkably increased after 50 passes.

(4) The topcoat layer containing 5 $SiO_2$ particulates per linear 100 μm as observed under an electron microscope has a lower surface roughness provides insufficient head cleaning effect and results in head adhesion, head clogging, topcoat abrasion, and surface roughening.

(5) Those topcoat layers containing pigment particulates observable under an electron microscope to have a distribution density or population of 10 to 1,000 per linear 100 μm and a particle size of less than 200 Å and have a surface roughness R20 of not more than 400 Å result in magnetic recording media having improved electromagnetic and physical properties.

EXAMPLE 2

(magnetic layer 3/Topcoat layer 1')

A topcoat composition 1' similar to topcoat composition 1 except that colloidal $SiO_2$ had a particle size of 50 Å was applied to form a topcoat layer having a thickness of 100 Å. Topcoat layers thus obtained were observed under an electron microscope. The number of pigment particulates having a particle size of less than 200 Å and surface roughness R20 are shown in Table II together with the physical properties of the topcoat layers.

TABLE II

| Pigment particulates, /100 μm | 5 | 10 | 50–100 | 600–800 | 1000 | 2000 | 0 |
|---|---|---|---|---|---|---|---|
| Surface roughness R20 | 10 | 10 | 20 | 50 | 80 | 100 | 80 |
| Properties (20° C., RH 60%, 30 passes) | | | | | | | |
| Head adhesion | marked | slight | no | no | slight | marked | marked |
| Head clogging | marked | slight | no | no | slight | marked | marked |
| Output reduction | marked | no | no | no | no | marked | marked |
| Topcoat abrasion | marked | slight | no | no | slight | marked | marked |
| Dropouts, /min. | 1000 | 200 | 100 | 100 | 200 | 2000 | 2000 |
| Preparation process | [5] | [5] | [5] | [5] | [1] | [1] | [1] |

EXAMPLE 3

Results similar to those of Example 1 were obtained from combinations of magnetic layers 2 and 3 with topcoat composition 1. For $\gamma$-$Fe_2O_3$ used in magnetic layer 1, a surface roughness of not more than 400 Å is acceptable, but it was found that a surface roughness of not more than 200 Å is preferred for electromagnetic properties.

Since magnetic layer 1 used a magnetic powder in the form of $\gamma$-$Fe_2O_3$, the topcoat layer should preferably have a thickness of not more than 800 Å, and most preferably not more than 450 Å in view of electromagnetic properties. For magnetic layers 2 and 3, electromagnetic properties similar to those of $\gamma$-$Fe_2O_3$ were obtained at a topcoat thickness of not more than 800 Å.

EXAMPLE 4

(Magnetic layer 2/Topcoat composition 2)

Various properties of Example 4 having a combination of magnetic layer 2 with topcoat composition 2 (observed to contain 900 pigment particulates per linear 100 μm) are shown in Table III along with those of Comparative Example 1 of the same combination except that no particulate pigment was contained.

TABLE III

| | Example 4 | Comparative Example 1 |
|---|---|---|
| R20, Å | 50 | 70 |
| Properties (20° C., RH 60%, 30 passes) | | |
| Head adhesion | no | marked |
| Head clogging | no | marked |
| Output reduction | no | marked |
| Topcoat abrasion | no | marked |
| Surface roughening | no | marked |
| Dropouts, /min. | 20 | 900 |
| Coefficient of friction | | |
| Initial | 0.22 | 0.25 |
| After 50 passes | 0.26 | 0.55 |

The data in Table III shows that the particulate pigment-containing topcoat layer exhibits improved properties while the particulate pigment-free topcoat layer exhibits poor properties and increases its coefficient of friction after 50 passes due to the lack of head cleaning effect.

EXAMPLES 5, 6, & 7

Various combinations of magnetic layers with topcoat layers are shown in Table IV along with their properties. Comparative Example 2 is substantially the same as Example 5 except that its topcoat composition 3' does not contain the particulate pigment contained in topcoat composition 3.

TABLE IV

| | Example 5 | Example 6 | Example 7 | Comparative Example 2 |
|---|---|---|---|---|
| Magnetic layer | 3 | 4 | 5 | 3 |
| Topcoat composition | 3 | 4 | 5 | 3' |
| Pigment particulates, /100 μm | 150 | 200 | 500 | 0 |
| R20, Å | 50 | 120 | 180 | 80 |
| Properties (20° C., RH 60%, 30 passes) | | | | |
| Head adhesion | no | no | no | marked |
| Head clogging | no | no | no | marked |
| Output reduction | no | no | no | marked |
| Topcoat abrasion | slight | no | no | marked |
| Dropouts, /min. | 100 | 80 | 80 | 1000 |
| Properties (40° C., RH 80%, 30 passes) | | | | |
| Head adhesion | moderate | no | no | stopped after 2 pases |
| Head clogging | slight | no | no | |
| Output reduction | slight | no | no | |
| Topcoat abrasion | moderate | slight | slight | |
| Dropouts, /min. | 200 | 100 | 100 | |
| Preparation Process | [5] | [5] | [1] | [1] |

The data in Table IV shows that the topcoat layers within the scope of the invention provide improved performance. Particularly, those topcoat layers containing a binder (Examples 6 and 7) provide improved performance even during operation at elevated temperatures (40° C., RH 80%).

We claim:

1. In a magnetic recording medium comprising
   a non-magnetic substrate having opposed major surfaces,
   a magnetic recording layer formed on one major surface of the substrate, and
   a topcoat layer formed on the magnetic layer,
   the improvement wherein the topcoat layer contains a submicron particulate pigment observable under an electron microscope to have a linear distribution density of 10 to 1,000 per linear 100 μm and a particle size of less than 200 Å whereby the topcoat layer has a surface roughness R20 of not more than 400 Å.

2. A magnetic recording medium according to claim 1 wherein the topcoat layer contains an organic binder.

3. A magnetic recording medium according to claim 2 wherein the binder is radiation curable.

4. A magnetic recording medium according to claim 1 wherein the topcoat layer contains an antioxidant.

5. A magnetic recording medium according to claim 1 wherein the topcoat layer has a thickness of 5 to 800 Å.

6. A magnetic recording medium according to claim 5 wherein the topcoat layer has a thickness of 5 to 450 Å.

7. A magnetic recording medium according to claim 5 wherein the topcoat layer has a thickness of 10 to 300 Å.

8. A magnetic recording medium according to claim 1 wherein the pigment particulates have a particle size of 20 to 200 Å.

9. A magnetic recording medium according to claim 1 wherein the pigment is selected from the group consisting of $SiO_2$, $TiO_2$, $ZrO_2$, $Cr_2O_3$, $Al_2O_3$, $Y_2O_3$, $CeO_2$, $Fe_3O_4$, $Fe_2O_3$, $ZrSiO_4$, $Sb_2O_5$, and $SnO_2$.

10. A magnetic recording medium according to claim 9 wherein the pigment is colloidal silica.

11. A magnetic recording medium according to claim 9 wherein the pigment is colloidal titania.

12. A magnetic recording medium according to claim 9 wherein the pigment is pyrolyzed chromium oxide.

13. A magnetic recording medium according to claim 9 wherein the pigment is pyrolyzed silica.

14. A magnetic recording medium according to claim 1 wherein the magnetic recording layer comprises ferromagnetic particles in a binder.

15. A magnetic recording medium according to claim 1 wherein the magnetic recording layer is a ferromagnetic thin metal film.

* * * * *